United States Patent
Lorkovic

(10) Patent No.: US 8,203,123 B2
(45) Date of Patent: Jun. 19, 2012

(54) NEUTRON DETECTION BY NEUTRON CAPTURE-INITIATED RELAXATION OF A FERROELECTRICALLY, FERROMAGNETICALLY, AND/OR CHEMICALLY METASTABLE MATERIAL

(75) Inventor: Ivan M. Lorkovic, Santa Barbara, CA (US)

(73) Assignee: Alliant Techsystems Inc., Arlington, VA (US)

( * ) Notice: Subject to any disclaimer, the term of this patent is extended or adjusted under 35 U.S.C. 154(b) by 808 days.

(21) Appl. No.: 12/401,097

(22) Filed: Mar. 10, 2009

(65) Prior Publication Data

US 2012/0119102 A1    May 17, 2012

(51) Int. Cl.
G01T 3/00 (2006.01)
(52) U.S. Cl. ................................. 250/390.01
(58) Field of Classification Search ............. 250/390.01
See application file for complete search history.

(56) References Cited

U.S. PATENT DOCUMENTS

| | | | |
|---|---|---|---|
| 2,703,283 A | 3/1955 | Eggert | |
| 3,083,778 A | 4/1963 | Friedman et al. | |
| 3,112,233 A | 11/1963 | Friedman et al. | |
| 3,452,199 A | 6/1969 | Stahlhut | |
| 3,727,296 A | 4/1973 | Cranston | |
| 4,143,274 A | 3/1979 | Apfel | |
| 4,292,527 A | 9/1981 | Franks et al. | |
| 4,613,758 A | 9/1986 | Ing et al. | |
| 5,701,010 A | 12/1997 | Martin | |
| 6,075,261 A | 6/2000 | Hossain et al. | |
| 6,395,453 B1 | 5/2002 | Kaneko et al. | |
| 6,493,411 B1 * | 12/2002 | Chu et al. ................ | 376/158 |
| 6,841,841 B1 | 1/2005 | Blish, II et al. | |
| 6,867,444 B1 | 3/2005 | Hughes | |
| 6,872,504 B2 | 3/2005 | Fedynyshyn | |
| 7,271,389 B2 | 9/2007 | August et al. | |
| 7,357,365 B2 | 4/2008 | Colman et al. | |
| 2006/0269033 A1 | 11/2006 | Taleyarkhan | |
| 2008/0246366 A1 * | 10/2008 | Burgener et al. ......... | 310/300 |

FOREIGN PATENT DOCUMENTS

WO    2007030156    3/2007

OTHER PUBLICATIONS

MacDonald, Scott A., et al., "Chemical Amplification in High-Resolution Imaging Systems," Acc. Chem. Res., vol. 27, No. 6, pp. 151-158, Jun. 1994.

McGregor et al., Design Considerations for Thin Film Coated Semiconductor Thermal Neutron Detectors-I: Basics Regarding Alpha Particle Emitting Neutron Reactive Films, Nuclear Instruments and Methods in Physics Research Section A: vol. 500. Issues 1-3, Mar. 2003.

McGregor et al., New Surface Morphology for Low Stress Thin-Film-Coated Thermal Neutron Detectors, Nuclear Science, IEEE Transactions, Aug. 2002, vol. 49, Issue 4, Part 1.

(Continued)

*Primary Examiner* — David Porta
*Assistant Examiner* — Minda Vu
(74) *Attorney, Agent, or Firm* — TriskBritt

(57) ABSTRACT

A system for detecting radiation using an array of cells containing a metastable material together with sensing apparatus and display apparatus.

10 Claims, 6 Drawing Sheets

Metastable Material Characterized By Hysteresis

Field, Temperature, or Pressure, e.g.

OTHER PUBLICATIONS

Bowden, The initiation of Explosion by Neutrons, Particles and Fission Products, Proceedings of the Royal Society of London, Series A, Mathematical and Physical Sciences, vol. 246, No. 1245, A Discussion on the Initiation and Growth of Explosion in Solids. (Jul. 29, 1958).

Lin et al., Direct Measurement of the Reaction Front in Chemically Amplified Photoresists, Science, vol. 297, No. 5580, pp. 372-375, Jul. 19, 2002.

Nikolic et al., Roadmap for High Efficiency Solid-State Neutron Detectors, Proceedings of SPIE, Optoelectronic Devices: Physics, Fabrication, and Application II, vol. 6013, Oct. 25, 2005.

Klann et al., Development of Coated Gallium Arsenide Neutron Detectors, Proceedings of ICONE 8, 8th International Conference on Nuclear Engineering, Baltimore, MD, Apr. 2-6, 2000.

Park, Thermal Neutron Detection Using Boron-10 and Sodium Salicylate Doped Epoxy Films, Harvard University, Jun. 1996.

* cited by examiner

NEUTRON DETECTION BY NEUTRON CAPTURE-INITIATED RELAXATION OF A FERROELECTRICALLY, FERROMAGNETICALLY, AND/OR CHEMICALLY METASTABLE MATERIAL

GOVERNMENT RIGHTS

This invention was made with Government support under Contract No. HSHQDC-07-C-0032 awarded by the Department of Homeland Security (DHS). The Government has certain rights in this invention.

FIELD OF THE INVENTION

The present invention is directed to a system for detecting the presence of neutrons using a $^{10}$B- or $^6$Li-containing electrically or magnetically metastable material, a material exhibiting electrical or magnetic hysteresis as a function of a controllable parameter such as temperature or an applied field.

BACKGROUND OF THE INVENTION

The development of weapons and energy plants that utilize radioactive material has given rise to a need for neutron detectors. The need to determine and know the entry of material including radioactive material requires performance of neutron surveillance at points of entry for ports, buildings, and other areas where people, cargo, or objects enter. Such neutron surveillance should be accomplished with a minimum of restriction or disruption of material flow and events.

Examples of detectors in a metastable physical system include cloud chambers and bubble detectors. In the former case, a medium consisting of a gas mixture supersaturated with a condensable vapor (e.g., water vapor) detects ionizing radiation. Although there is a higher vapor pressure of water vapor than would be possible at equilibrium, the nucleation of small water droplets in the absence of dust particles represents an energetic barrier to such equilibration, so no cloud is formed, the medium cannot reach equilibrium and, hence, is termed "metastable." Gas ionization from radiation, however, facilitates the water vapor condensation nucleation. A single radiation particle track induces many orders of magnitude times as many molecules to condense from the gas phase and form a detectable cloud.

In a complementary example, neutron detectors have been fabricated from superheated liquid/gel emulsions. In this case, the nucleation of a gas bubble within the liquid represents a barrier, due to surface tension, preventing equilibration by boiling. In this case, a $^{10}$B(n,$\alpha$)$^7$Li disintegration event deposits enough energy into a small enough volume of this liquid that the bubble nucleation barrier is overcome, and the accumulated energy of superheating a macroscopic (detectable easily by the unaided eye) amount of liquid is released by a single disintegration event. In this case, the gain is limited only by the rheological properties of the gel and the size of the micelle. Unfortunately, neither cloud chambers nor bubble detectors can easily be used as inexpensive portal monitors for neutrons emitted by special nuclear material.

The effectiveness of neutron detectors is, in part, determined by their ability to discriminate neutron radiation from other types of radiation, such as gamma or beta radiation. Because the latter interact strongly only with heavy or "high-Z" elements, and create signals that may obscure neutron signals, there is much interest in development of "low-Z" neutron detectors comprised mostly of less massive elements, i.e., organic polymers or organic molecular crystal detectors, which respond robustly only after a neutron absorption event that creates energetic massive particles. On the other hand, detectors that induce phase transitions are expected to be more sensitive to deposited energy density than those that measure charge created by ionizing radiation, and so it is not clear that a high-Z metastable material will not also be highly discriminating. What is clear in both of the above examples (cloud chamber and bubble detector), is that the nucleation of such equilibration pathways, whether in a low-Z or high-Z medium, becomes more likely as the energy deposition of the energetic particle becomes more dense, and therefore, these techniques are most effective when more massive (alpha and heavier) particles are created upon neutron capture.

A separate class of neutron detector senses light emitted from a scintillator. Scintillators have been developed for both fast and slow neutron detection. Fast neutrons have a higher cross section for collisions with protons that subsequently transfer energy to the scintillator, which promptly emits light. Moderated (slow) neutrons, on the other hand, have a higher cross section for capture by nuclei such as $^3$He, $^6$Li, and $^{10}$B and for these nuclei, neutron capture disintegrations result that produce heavier energetic particles, such as a 1.7 MeV alpha particle, in the case of the $^{10}$B capture, that transfer energy to the scintillator. The light from a scintillator is detected by a photomultiplier tube to generate an electrical pulse proportional to the number of photons created by the energetic particle(s). Scintillator systems' potential for large area neutron detectors, such as required for portal monitoring, is limited in that the cost of the many photomultiplier tubes required for an effective detector becomes prohibitive.

The most common type of thermal neutron detector is a gas filled counter, typically using pressurized gaseous helium-3 filled tubes. These $^3$He detectors are delicate and occasionally indicate false positive signals when abruptly moved or impacted. Although effective, such types of neutron detectors are generally not suitable for operations requiring devices capable of functioning for long periods with low power consumption. $^3$He is also extremely expensive. Therefore, proliferation of such devices to anything other than primary portals would be prohibitively expensive.

Yet another type of neutron detector is a solid state electronic device that can sense alpha particles emitted from a neutron converter material in which an (n, $\alpha$) reaction has taken place. The converter material is required to convert incident neutrons into emitted charged particles, which are more readily sensed. When the emitted charged particle transits a semiconductor device, the charged particle liberates charges in its wake or path that may be collected and used to sense the event stimulated by the initial neutron reaction. Such devices serve as neutron detectors. In demonstrations of such a device, free-standing converter foils are placed near a silicon detector, such as a PIN diode. Typically, films of converter material are place in contact with or deposited directly upon semiconductor detectors. Lithium metal has been used for this purpose, although the chemical reactivity of the lithium metal leads to shorter detector life. A longer life for such devices has been achieved using compounds of lithium, such as lithium fluoride, which is a hard crystalline-type material. Boron metal has also been used as a coating on semiconductor devices.

Semiconductor memory cells, which are susceptible to single event upsets or single event errors when an incoming particle induces an error in the memory cell have been used to detect neutrons. Attempts have been made to use commercial memory circuits with a neutron converter so that single event upsets detect neutrons. In manufacturing semiconductor devices, boron has been used as a dopant and used in glass as a passivation layer used either to cover the circuit structures or to encapsulate a completed semiconductor device. Boron-10 in the dopant or borophosphosilicate glass (BPSG) passivation layer is responsible for sensitizing a circuit to neutron radiation.

U.S. Pat. Nos. 7,271,389; 6,867,444; 6,841,841; and 6,075,261 disclose attempts to utilize a conventional semiconductor memory device as a neutron detector using a neuron-reactant material (converter) coated over a conventional Flash memory device. Alpha particles emitted by the boron typically must pass through structural layers that define the circuit before they reach an active semiconductor, which results in insensitive detectors because the boron conversion material is not located close to the active semiconductor material layer. This causes alpha particles generated by the boron conversion material to dissipate their energy in the intervening structural material so that a sufficient charge in the active semiconductor material layer to cause single event "upsets" cannot be generated. Hence, it is important for the detecting element and the boron-containing element to be one and the same, and this precludes silicon-based devices, because the boron would render the silicon conductive and short the circuit.

Therefore, in view of problems and limitations associated with current neutron detectors, it would be useful to have a neutron detector that does not require the use of high pressure tubes of expensive $^3$He or photomultiplier tubes, that operates at low power consumption, that can sense with high gain individual neutron events, and that is not sensitive to other types of radiation.

SUMMARY OF THE INVENTION

A system for detecting radiation using either a ferroelectric material or ferromagnetic material.

DETAILED DESCRIPTION OF THE INVENTION

The present invention relates to a system for detecting radiation using either a ferroelectric material or ferromagnetic material, below the Curie temperature for such material, containing either in a molecular form or in a nanoparticulate form, $^6$Li or $^{10}$B. The system includes an assembly of electrodes as a detection matrix or an assembly of magnetic read/write heads extending across a two-dimensional array of these materials. First, either a polarization or magnetization is established within a pixel or a cell containing such a material by the application of a strong polarizing field. Subsequently, either an opposite electric field or magnetic field is applied to the pixels having a level less than a coercive field necessary for such a material to transition to the opposite polarization. This results only in those pixels that have experienced neutron capture-induced energy deposition detectably relaxing to the opposite polarization. One feature of the invention is that the energy of less massive forms of radiation, such as muons, beta particles, and gamma radiation, can be deposited at low density levels within such materials to nucleate a polarization change. These materials are preferably created from organic-type crystalline or amorphous material having a low density and are not sensitive to radiation other than nascent alpha radiation and/or heavy nuclei created upon the absorption of a neutron. As an alternative to a change in the electric or magnetic field applied across pixels of the material, the field may be held constant, and the temperature may be cycled if the material is bistable (shows hysteresis) with respect to temperature cycling.

Figure 1:
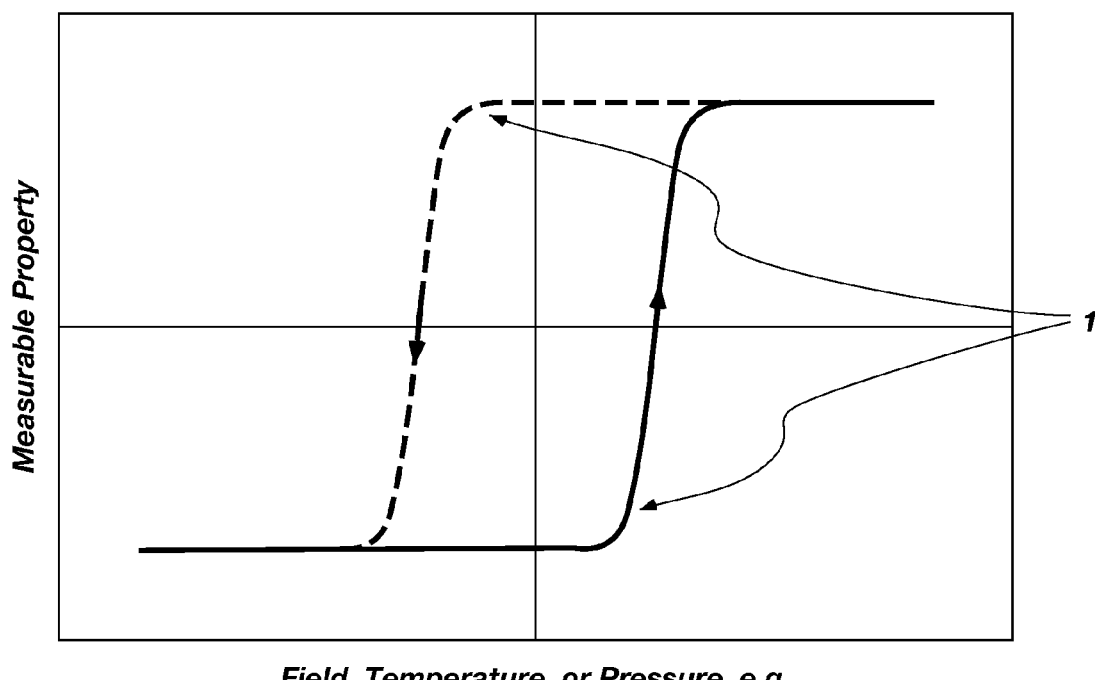
FIG. 1 is an illustration of the behavior of a generic metastable material.

Illustrated in FIG. 1 is the behavior of a metastable material in a cell or pixel used for the detection of radioactive material. The present invention is directed to a system for detecting the presence of neutrons using a metastable material that contains $^{10}$B, $^6$Li, or both, or some other nucleus having a high neutron cross section. The hysteresis diagram 1 of metastability of the active material, which contains $^{10}$B, $^6$Li, or some other nucleus with high neutron cross section is illustrated in drawing FIG. 1. The radiation-induced relaxation of $^{10}$B, $^6$Li, or some other nucleus with high neutron cross section will create extremely high gain in the detection of neutrons, limited only by the size of a pixel through which the relaxation propagates. The metastability of the detecting material that contains $^{10}$B, $^6$Li, or some other nucleus with high neutron cross section which may be ferroelectric, ferromagnetic, or chemical in nature, is best suited for an application if it is re-settable electrically or magnetically to negate the effects of background thermal neutrons on the useful life of the device. It is important that the products of neutron absorption be relatively massive, as well as highly energetic so that the energy deposited into the metastable material is distributed over a volume small enough that the activation barrier for nucleation of the globally stable (as opposed to metastable) polarization is exceeded, and that this energy density is significantly higher than the thermal background.

Figure 2:
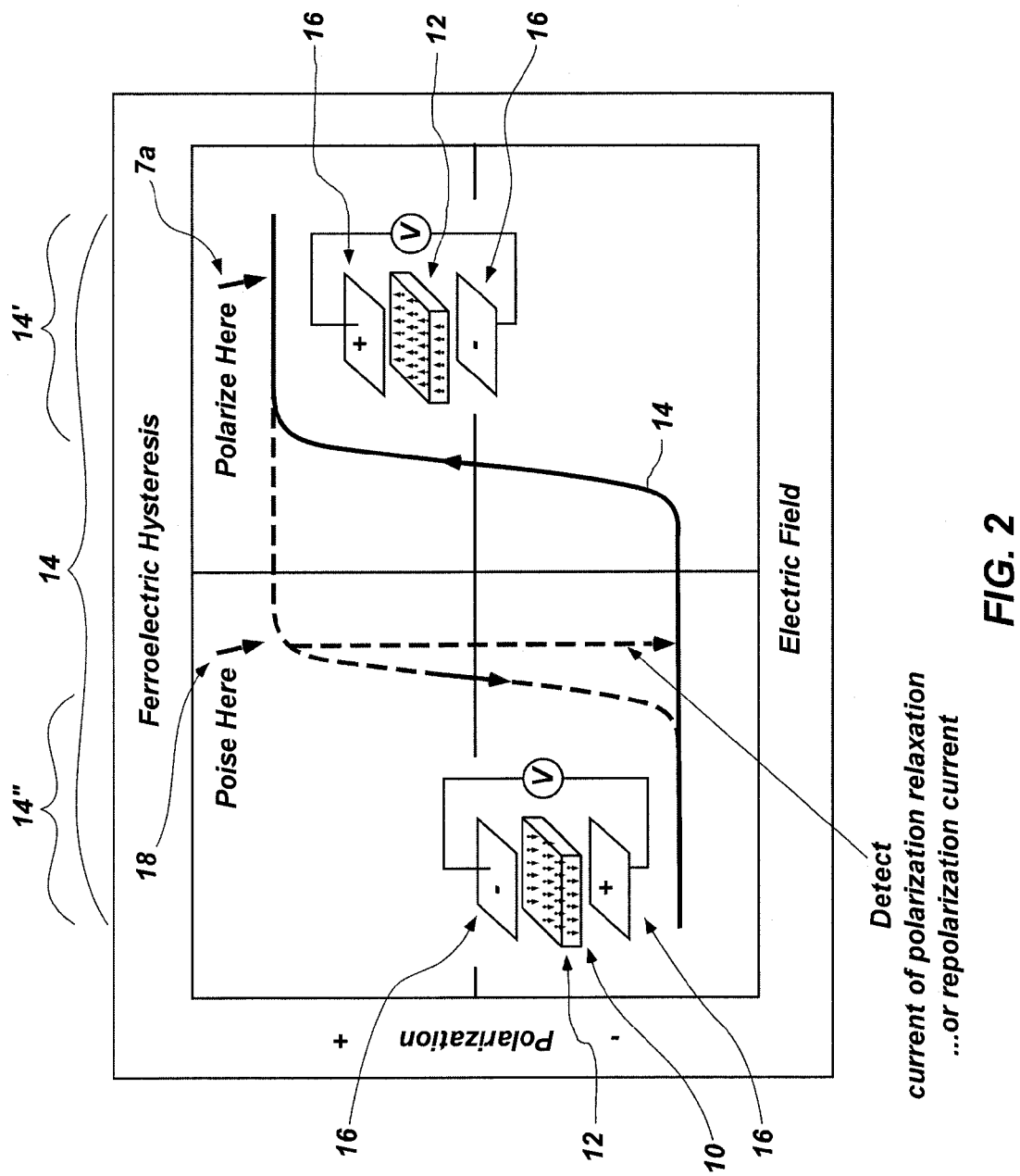
FIG. 2 is an illustration of the behavior of a single detector pixel of a metastable material in a cell.

Illustrated in drawing FIG. 2 is the behavior of a cell of metastable material comprising either the ferroelectric behavior or the ferromagnetic behavior of the material 12 of a single cell or pixel 10 of a neutron detecting array, the single cell or pixel 10 having typical physical dimensions of approximately 0.5 mm×0.5 mm×0.05 mm thick. The special property of either the ferroelectric materials 12 or the ferromagnetic materials 12 in the pixel 10 is the hysteresis of such materials in either their electrical polarization curve 14 or magnetic polarization curve 14. This hysteresis of such a material 12 may be utilized to achieve high gain in the detection of single disintegrations that create energetic nuclei, such as $^{10}$B(n, α)$^7$Li nuclei in the material 12. First, energy is stored in either the ferroelectric material 12 or ferromagnetic material 12 by (arbitrarily) polarizing the pixel 10 in the positive state ("+" state, illustrated on the right side of the curve 14 of FIG. 2 by the upward pointing arrows) using a field having a strength significantly higher than the coercive field of such a material 12, which is defined as a field having a strength at which the polarization of the material 12 is shifted halfway from one pole to the other as illustrated by the portion 14' of the curve 14, at a given rate of field change. To polarize the material 12, electrodes 16 are to be placed above and below the pixel 10 applying a field through the thickness (or thin dimension of the material 12) as illustrated at 7a on the right side of FIG. 2. After the polarization of the material 12 of the pixel 10 is complete, the strength of the applied field is brought back to a level not quite sufficient (see, e.g., arrow 18 adjacent "Poise Here" in FIG. 2) to change the polarization of the material 12 of the pixel 10 back to the original state as illustrated by portion 14″ of the curve 14 by reversing the polarity of the electrodes 16 located above and below the material 12 as illustrated on the left side of FIG. 2 (reverse polarity shown by downward arrows). At this strength of the applied field in the material 12, no repolarization of the material 12 on the portion 14″ of the curve 14 to the left of the arrow 18 occurs in a reasonable period of time for such material 12 unless a highly disruptive event, such as the passage of a 1.7 MeV alpha particle originating from a neutron absorption by a $^{10}$B atom, allows small regions of negative polarization ("−" polarization) to nucleate in the material 12.

Figure 3:
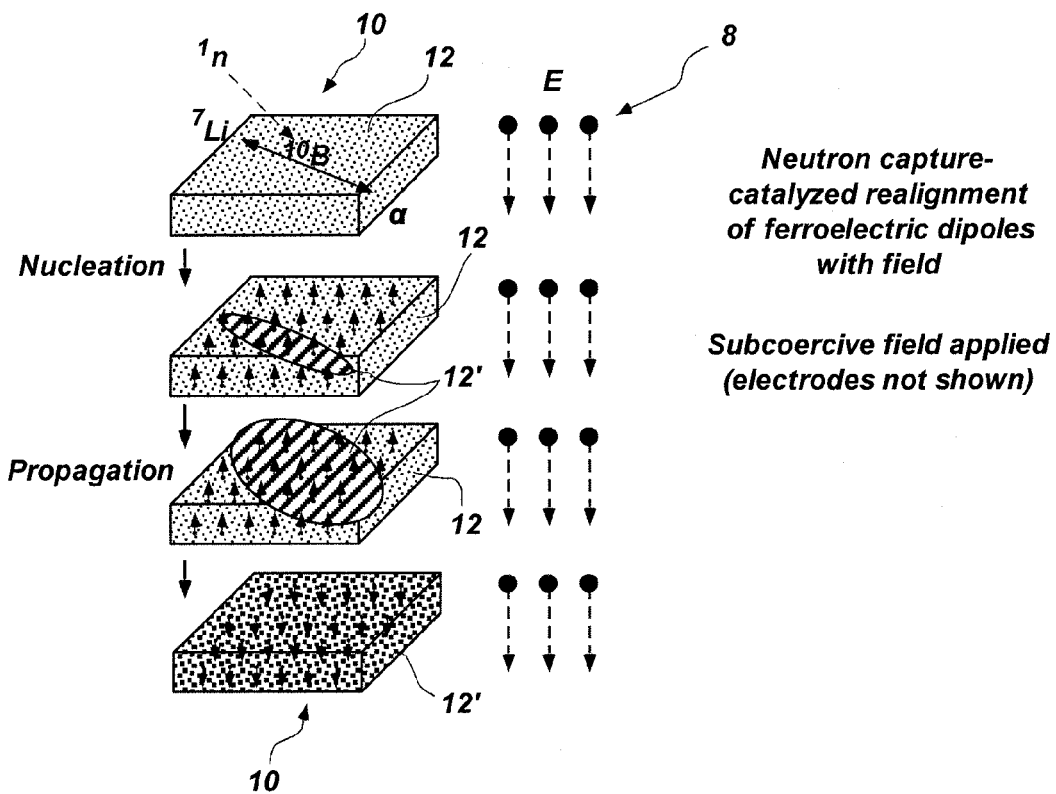
FIG. 3 is an illustration of the cell having the metastable material change polarization.

Illustrated in FIG. 3 at the top of the drawing figure is a cell or pixel of material 12 comprising $^7$Li, $^{10}$B being impacted by a nucleus $^1_n$ causing nucleation in a region 12′ of negative polarity in the material 12 (second drawing from top of FIG. 3). These small regions of negative polarization 12′ in the material 12 then propagate outward in the material 12 (third drawing from top in FIG. 3), until the entire material 12 of the pixel 10 or a large part of the material 12 in the pixel 10 becomes negatively polarized material 12′, (fourth drawing or lowermost drawing in FIG. 3), a change easily detected electrically with appropriate well-known circuitry for detection of a change in the material 12 (or detected magnetically using well-known magnetic head apparatus).

Figure 4:
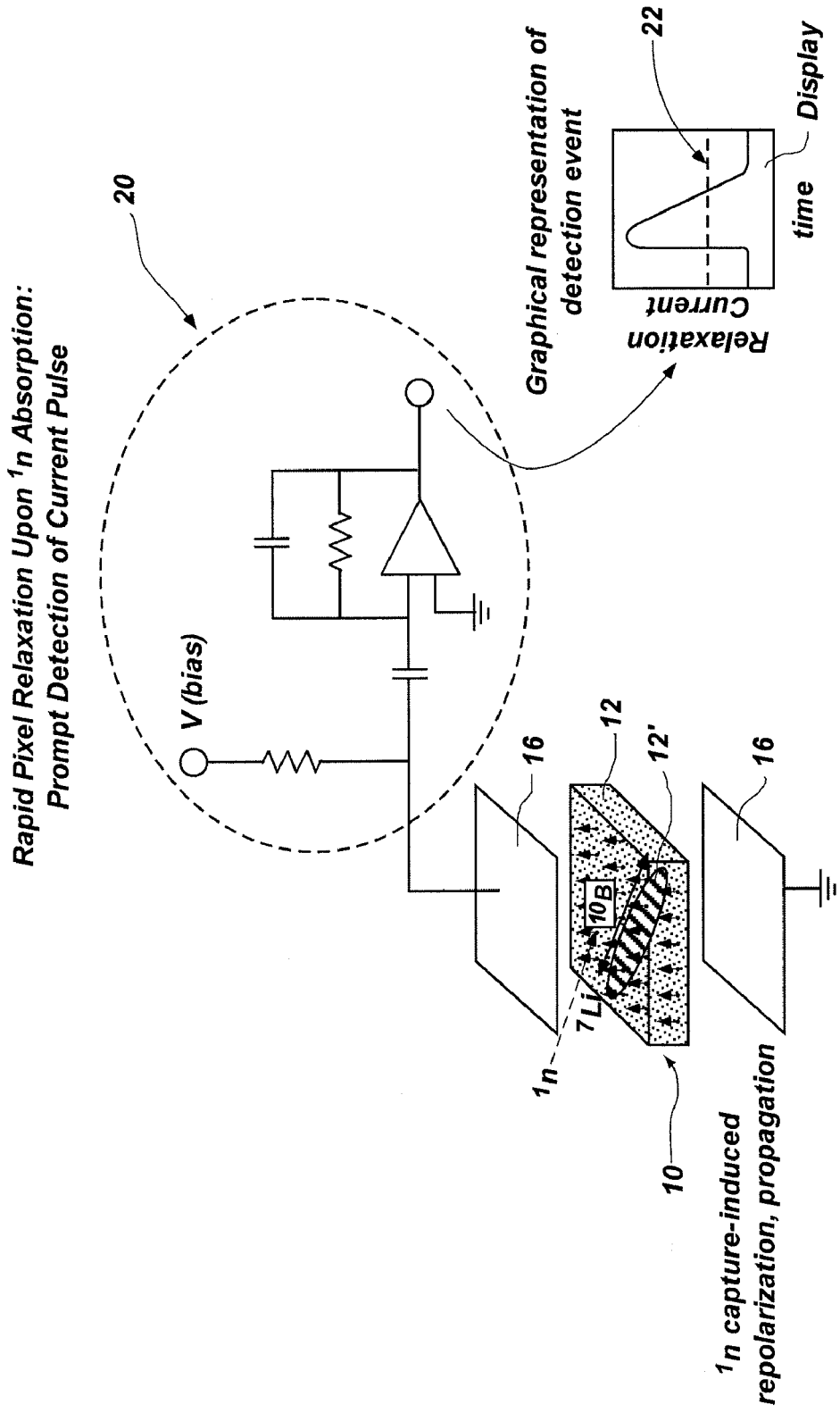
FIG. 4 is an illustration of one type of detection strategy used in the case of a rapid relaxation of the metastable ferroelectric pixel in which an (n, α) event has occurred wherein the depolarization current can be detected as a pulse.

Illustrated in FIG. 4 is the detection of the polarity change in a region 12′ of the material 12 in a pixel 10 as detected using a suitable apparatus 20 connected to electrodes 16 and connected to a suitable display 22 to detect and display the region 12′ of the material 12. After the detection and display of the region 12′ of the material 12, the material is reset to the state illustrated in FIG. 2 at the arrow 18, and the process repeated to detect radiation from a radioactive material causing a change in polarity of the material 12.

Figure 5:
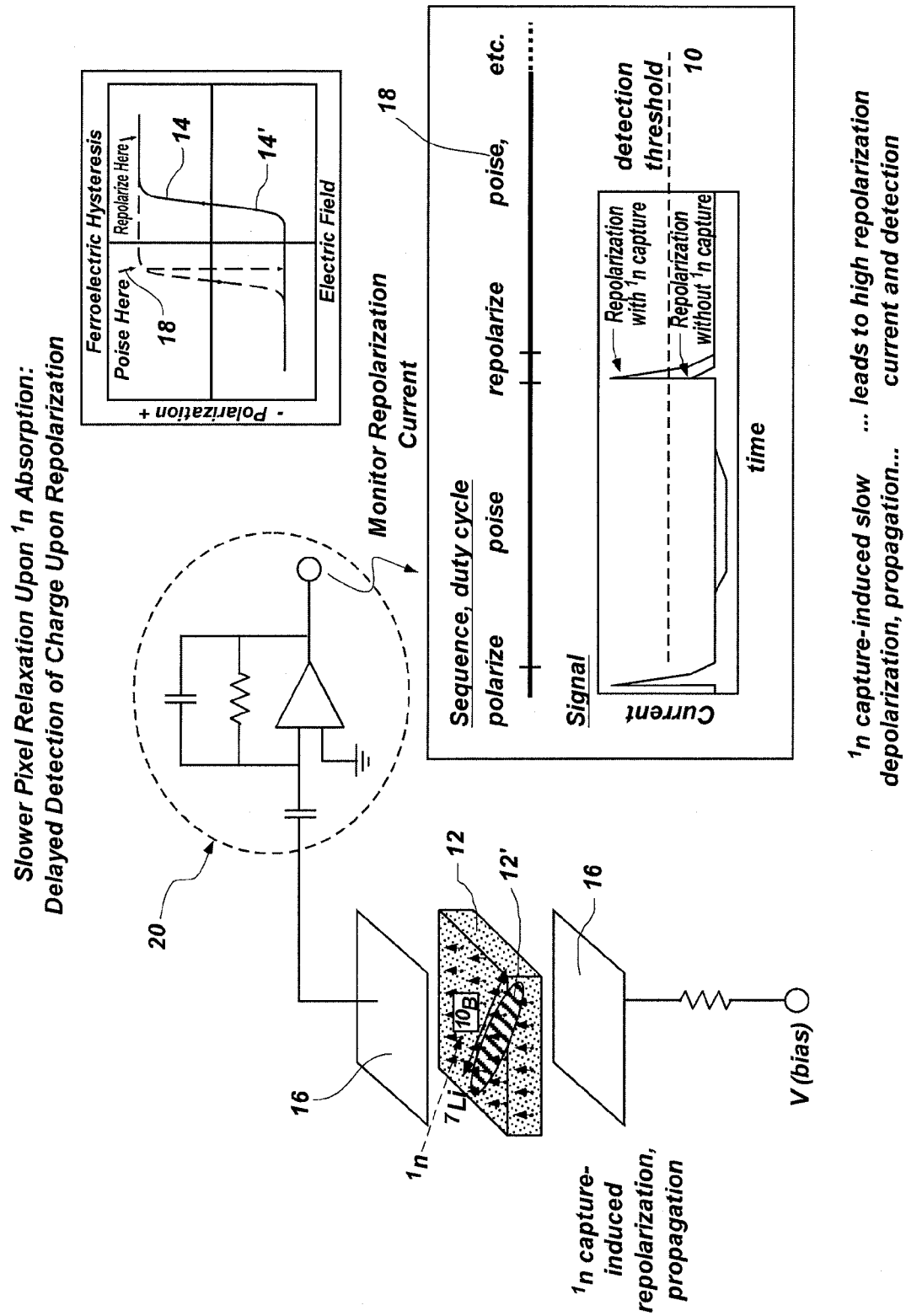
FIG. 5 is an illustration of a second type of detection strategy used in the case of a slower relaxation of the metastable ferroelectric pixel in which an (n, α) event has occurred wherein the depolarization current is small but can be detected as a repolarization current when the pixel is repolarized at the end of the duty cycle.

Illustrated in FIG. 5 is delayed detection of the polarity change in a region 12′ of the material 12 in a pixel 10 as detected using suitable apparatus 20 connected to electrodes 16 using a suitable apparatus 22 to display changes in the current used to repolarize the material 12. The region 12′ of the material 12 has been slowly depolarized to a negative polarity region 12′ of the material 12. The detection of the region 12′ of the material 12 occurs during the repolarization of the material 12 because a current spike occurs in the apparatus 20 being used to repolarize the material 12. Such a current spike is greater than the threshold current for the repolarization of the material 12 having no negative polarity region 12′ and is displayed as such.

Figure 6:
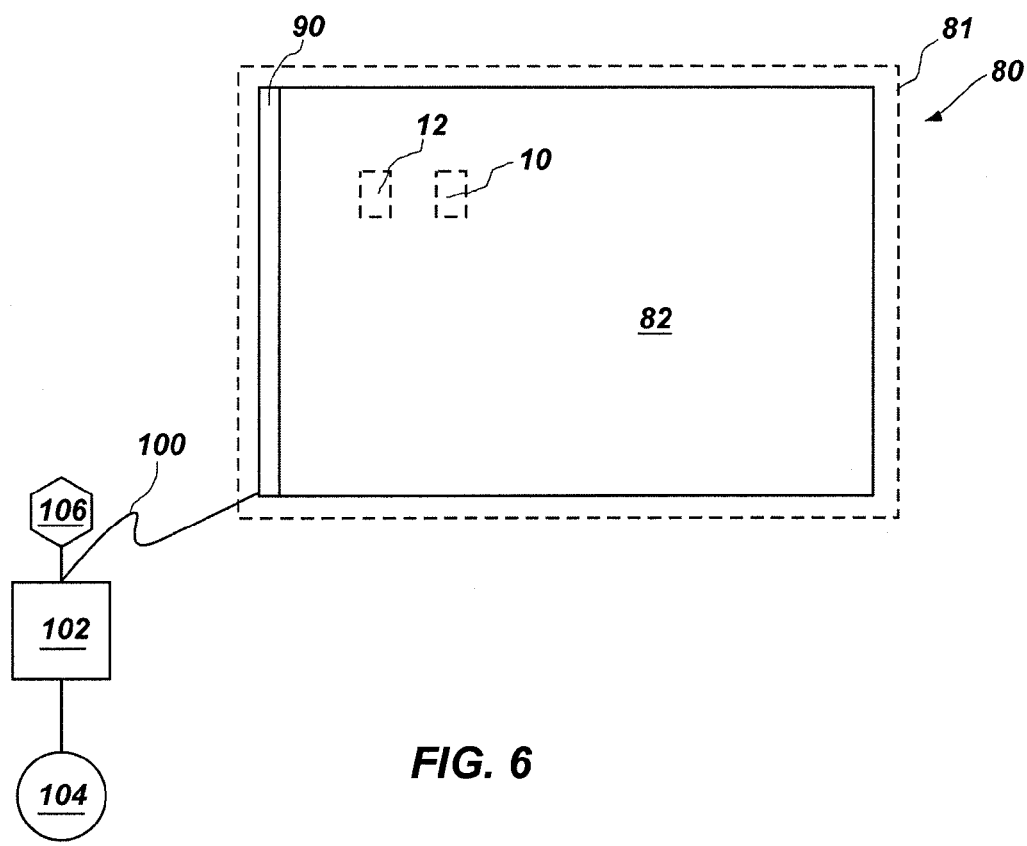
FIG. 6 is an illustration of an array using the metastable material therein.

Illustrated in FIG. 6 is a system 80 for the detection of neutron radiation. A substrate 82 of suitable material, such as material 12 in an array of cells, is located in a housing 81, as depicted by dashed lines, of any suitable material and suitable size, such as silicon, glass, etc. The material of substrate 82 has been previously polarized and subsequently exposed to a field of opposite magnetic polarity insufficient to overcome the hysteresis innate to the material 12, which will change polarity when exposed to radiation from any possible source thereof, such as radioactive material in a cargo container, suitcase, brief case, package, etc. Connected to the substrate 82 is a suitable electromagnetic device 90, which can scan the material 82 to detect any change in the polarity thereof from any effects of radiation thereon from any source. Connected to the electromagnetic device 90 by connecting member 100 is a suitable digital computer 102 that continuously monitors and displays the output of electromagnetic device 90, processing the output thereof and displaying the change in the polarity of the material 12 on a suitable display 104, such as any commercially available monitor.

Additionally connected to the output of the digital computer 102 is an alarm 106 that may be activated when a predetermined amount of change in the polarity of the material 82 has changed. The predetermined change in the polarity of the material 12 will cause the activation of the alarm 106, which will serve as an indication of the level of radiation from the source being monitored by the system 80. The connecting member 100 may be any suitable type connecting member such as an electrical cable, optical fiber cable, etc. If desired, a wireless transmission system may replace the connecting member 100 for the transmission of the output of the scanner 90 to the digital computer 102 so that the digital computer 102 may be conveniently and or remotely located with respect to the system 80.

An example of a ferroelectric neutron detecting apparatus comprises 1:1 Co-crystals of deuterated $^{10}$B-boric acid and triglycine which are fabricated by slow crystallization from water and cut into 1 mm×1 mm×0.1 mm pieces where the crystal axis of maximum ferroelectricity is oriented parallel with the short dimension of the crystal. The pieces are then fit into an array of electrically addressable wells with back contacts of aluminum. Aluminum electrodes are evaporated through a mask over the top of the array. The crystals, now pixels, are collectively cycled through their ferroelectric hysteresis loops and each pixel is calibrated for the total capacitive charge required for a complete polarization change. After poling the array of pixels at one extreme, the array is poised at an individually characterized SCV in the opposite direction, during which time the current required to maintain this voltage is monitored. In the event of neutron absorption, the resulting alpha track catalyzes repolarization, and a pulse of current is observed. If spreading of the polarization from the alpha track throughout the pixel is so slow as to not resemble a pulse, a positive signal is deduced by stepping the voltage of the array to the original PV. Pixels that have "turned" from a neutron event exhibit a much higher current pulse to repolarize than those that are not subjected to a catalyzed relaxation. This cycle of poling at PV and detecting at SCV is repeated at a frequency and duty cycle appropriate to the application.

Another example of a polarized ferroelectric material comprises 1:1 co-crystals of dideuteropentachloro-dodecacarborane-ic acid ($D_2C_{10}B_{11}Cl_5H_5$) and phenazine (an acid-base salt), which are crystallized from water and crystals distributed among the array of pixels as described hereinabove and operated in the same manner to detect neutrons.

An example of a polarized paramagnetic material is bistable paramagnetic crystals bis(9-N-butylamino-1-oxo-phenalene)-ium borate crystals ($^{10}$B enriched), which are distributed among pixels of an array capable of measuring magnetic susceptibility or conductivity. The temperature of the array is cycled to 360 K where the pixels change to their paramagnetic insulating state. The temperature is then dropped to just above the lower "coercive" temperature, at which the conductivity rises and the susceptibility drops. For several time intervals, chosen to represent the time resolution required, the number of pixels that increase conductivity and decrease magnetic susceptibility are counted electrically. An excess of pixels detected to have changed conductivity or magnetic susceptibility represents excess neutron detection.

The temperature is cycled again to over 360 K to regenerate the array when a chosen percentage of pixels has changed polarity.

It will be apparent to those of skill in the art that changes, revisions, additions, and deletions may be made to the present invention, such as having different metastable materials, different polarized material, etc. Additionally, a system for detecting radiation may include a metastable chemical material, and a polarized magnetic material. Such are intended to be within the scope of the claimed invention.

What is claimed is:

1. A system for detecting neutron radiation, comprising:
a metastable material having a density less than 2 g/cm$^2$ containing at least one of $^{10}$B or $^6$Li in a cell, wherein a disruption resulting from disintegration of the neutron absorbing atom leads to an easily detectable relaxation of a hysteretic property of the metastable material;
electrodes and circuitry comprising a detector for controlling and detecting a change in the state or polarization in the metastable material; and
at least one computer to control at least one detector for the setting thereof, the detection of a change in the metastable material, and the recording and display of information regarding the metastable material.

2. The system of claim 1, wherein the metastable material comprises a ferroelectric material having hysteresis in its electrical polarization as a function of an applied electric field.

3. The system of claim 1, wherein the metastable material comprises a ferromagnetic material having hysteresis in its magnetic polarization as a function of an applied magnetic field.

4. The system of claim 1, wherein the metastable material comprises a paramagnetic material having hysteresis in its magnetic polarization as a function of an applied magnetic field.

5. The system of claim 1, wherein the metastable material comprises a ferromagnetic or paramagnetic material having hysteresis in its magnetic polarization as a function of temperature.

6. The system of claim 1, wherein the metastable material comprises one of a ferromagnetic material having hysteresis in a magnetic polarization thereof, a paramagnetic material having hysteresis in the magnetic polarization thereof, and a ferroelectric material having hysteresis in an electrical polarization thereof.

7. The system of claim 1, wherein the metastable material comprises one of a ferromagnetic material having hysteresis in conductivity thereof as a function of the temperature thereof, and a paramagnetic material having hysteresis in conductivity thereof as a function of the temperature thereof.

8. The system of claim 1, wherein:
the at least one computer is connected to a plurality of detectors for a plurality of cells.

9. The system of claim 8, further comprising:
an alarm connected to the at least one computer activated when a reaction has occurred in a predetermined number of the plurality of cells of metastable material.

10. The system of claim 8, further comprising:
a wireless connection apparatus connecting the at least one computer to the plurality of detectors.

* * * * *

UNITED STATES PATENT AND TRADEMARK OFFICE
CERTIFICATE OF CORRECTION

PATENT NO. : 8,203,123 B2
APPLICATION NO. : 12/401097
DATED : June 19, 2012
INVENTOR(S) : Ivan M. Lorkovic It is certified that error appears in the above-identified patent and that said Letters Patent is hereby corrected as shown below:

On the title page:
In ITEM (74) *Attorney, Agent or Firm*: change "TriskBritt" to --TraskBritt--

Signed and Sealed this
Twenty-seventh Day of November, 2012

David J. Kappos
*Director of the United States Patent and Trademark Office*